United States Patent [19]

Yeh

[11] Patent Number: 5,281,041

[45] Date of Patent: Jan. 25, 1994

[54] SWIVEL ROPE END FITTING

[76] Inventor: John Yeh, 30970 San Benito Ct., Hayward, Calif. 94544

[21] Appl. No.: 972,512

[22] Filed: Nov. 6, 1992

[51] Int. Cl.[5] ............................................. F16D 1/12
[52] U.S. Cl. ...................................... 403/60; 403/78; 403/184; 24/135 R
[58] Field of Search ................ 403/60, 78, 165, 184, 403/299, 343; 24/114 R; 59/95

[56] References Cited

U.S. PATENT DOCUMENTS

| | | | |
|---|---|---|---|
| 231,751 | 8/1880 | Bailey et al. | 403/78 |
| 515,023 | 2/1894 | Salathe . | |
| 2,195,997 | 4/1940 | Perkins . | |
| 2,387,599 | 10/1945 | Miller . | |
| 2,466,243 | 4/1949 | Johnson . | |
| 3,471,185 | 10/1969 | Parr | 403/60 |
| 3,504,937 | 4/1970 | Panovic . | |
| 4,037,978 | 7/1977 | Connelly | 403/164 |
| 4,311,405 | 1/1982 | Hawley | 403/164 |
| 4,321,840 | 3/1982 | Kalamon | 403/165 |
| 4,388,012 | 6/1983 | Erickson | 403/142 |
| 4,687,365 | 8/1987 | Promersberger | 403/2 |
| 4,955,749 | 9/1990 | Panovic | 403/11 |
| 5,024,548 | 6/1991 | Timmington | 403/78 |

Primary Examiner—Richard K. Seidel
Assistant Examiner—Erik R. Puknys
Attorney, Agent, or Firm—Mark D. Miller

[57] ABSTRACT

A swivel end fitting for rope, cord or leash designed to allow said rope to be attached to another object and thereafter withstand considerable shock without coming apart or becoming disengaged from said rope. The invention is made up of a pointed screw-shaped base element permanently attached to the rope; a central socket element for receiving the screw-shaped base element at one end, and receiving a rounded terminal element at the other end; and a swivel eye terminal element having a stem and head thereon, said stem and head being bisected by a linear gap. As the terminal element is pressed into the socket element, the head is squeezed together over the gap until it crosses a collar on the socket element at which point the head pops back into its original position, now able to freely pivot. Then the screw-shaped base element is fully inserted into the opposite end of the socket such that the point thereof protrudes into said gap, preventing the head from squeezing back out of the collar.

3 Claims, 2 Drawing Sheets

5,281,041

SWIVEL ROPE END FITTING

BACKGROUND ON THE INVENTION

1. Field of the Invention

The present invention relates to end fittings for rope, and particularly to a fitting having a swivelling terminal element having a swivel eye thereon allowing attachment to other objects.

2. Description of the Prior Art

Numerous swivels providing joints between two parts such that the parts may pivot freely are well known in the art. A basic swivel assembly includes a pair of elements, one having a bore therein, and the other having a stem that fits into said bore. At the end of the stem is a head which is wider in diameter than the bore. Once engaged, the large size of the head prevents the two elements from coming apart, but allows them to pivot. See U.S. Pat. Nos. 51,023, 3,504,937, 4,037,978, 4,955,749 and 5,024,548.

The persistent problem presented in swivel manufacture has always been devising an economical yet effective means for connecting the two elements together. Since the diameter of the head must be larger than that of the collar of the bore, various methods have been employed to introduce said head into said bore below the collar, without adhering the head to the collar or the bore.

The most common method for causing a collar to surround a swivel shank above the head is to manufacture the collar in two pieces. This way, the collar may be attached around the stem, which may still pivot within the collar. Thereafter, the collar may be attached by screw threads, welding, or other means to another element to complete the swivel, as in U.S. Pat. No. 5,024,548. Of course, the obvious drawback of such method is that the collar must be created in two parts, requiring expensive manufacturing and assembly.

Another means for solving this problem is to cause the stem and head assembly to be slided under the collar by way of an opening on the side of the lower element, as disclosed in U.S. Pat. No. 4,037,978. However, the opening into which the stem-and-head must slide, must also be closed in some fashion, which requires additional parts, labor, and more expensive manufacture.

Another method of assembly is the insertion of a two-pronged screw eye piece through the collar of the lower element as disclosed in U.S. Pat. No. 515,023. In this patent, once the stem is inserted through the collar, a spreading dog is put in place in the screw eye to open the protruding ends to prevent the head from coming back through the collar. The swivel described in this particular patent is not suited for any permanent or rigorous use, since the insertion of a rope or other material into the screw eye may dislodge the spreading dog resulting in the release of the screw eye element from the collar.

SUMMARY OF THE INVENTION

Swivel rope end fittings are widely used in commercial and recreational applications. The need for a permanently mounted swiveling end fitting for ropes, leashes and cords is ever present In the area of water sports, including without limitation, the activity known as body boarding, the need for a leash having permanently mounted swivel assemblies at either end is important. The swivel assembly must be securely attached to the leash, must be able to freely pivot, and must be able to withstand the constantly changing shocks and pressures associated with the sport of body boarding At the same time, the end fitting must be easy to manufacture and inexpensive.

It is therefore a primary object of the present invention to provide a swivel end fitting that is permanently attached to a rope, leash or cord.

It is a further important object of the present invention to provide a swivel rope end fitting having a screw eye on the terminal element thereof to which a rope or other object may be attached.

It is a further object of the present invention to provide a swivel rope end fitting having a screw eye thereon, the terminal element of which is capable of withstanding substantial shocks, jerks, changes in pressure, and other sporadic motion without becoming disengaged from the end of the rope.

It is a further object of the present invention to provide a swivel rope end fitting that is easy to manufacture, and does not require a two-piece collar.

Further objects of the invention will become apparent from the following disclosure.

DETAILED DESCRIPTION OF THE DRAWINGS

Figure 2:
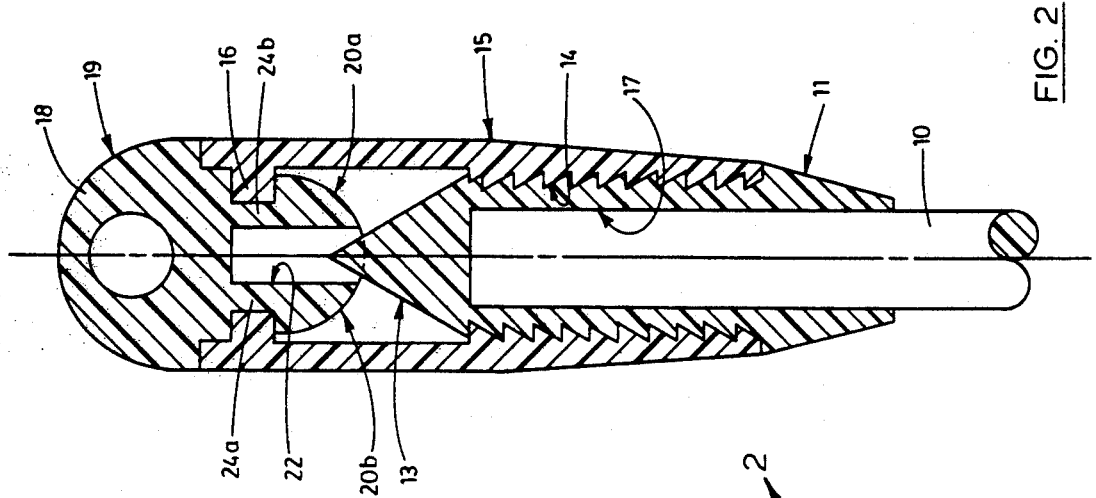
FIG. 2 is a cutaway view of the invention along line 2—2 of FIG. 1.
Figure 1:
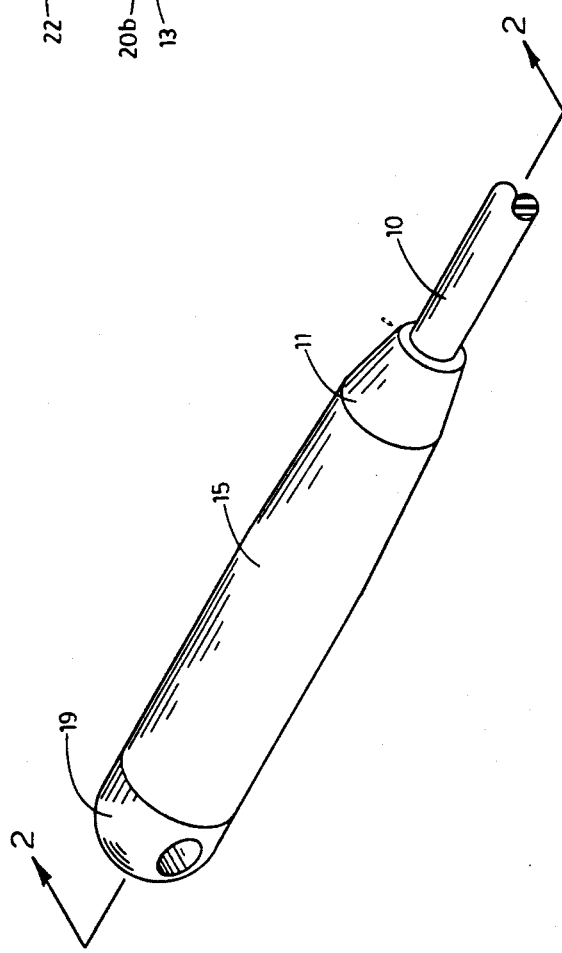
FIG. 1 is a perspective view of the invention attached to a solid cord.
Figure 3:
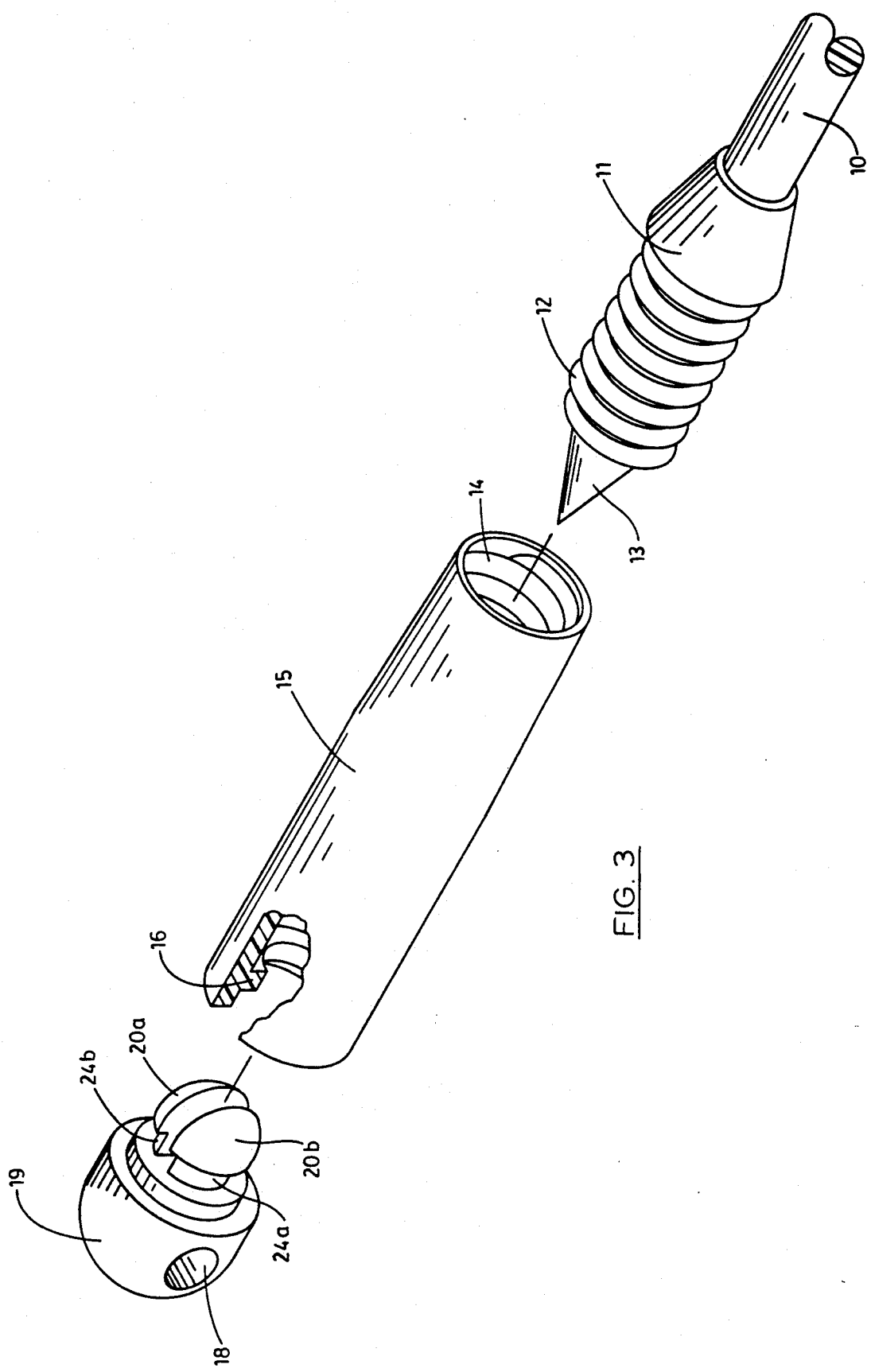
FIG. 3 is an exploded and partially cutaway view of the invention showing the elements thereof in linear sequence.

Referring to the drawings wherein like reference characters designate like or corresponding parts throughout the several views, and referring particularly to FIG. 2, it is seen that the invention includes a screw element 11 having a series of screw threads 12 along its route, terminating in a point 13 at one end. At the opposite end is a bore 17 into which the rope is permanently mounted by strong adhesive, or other suitable permanent bonding.

A socket element 15 is provided which has a bore through its entire length A series of screw threads 14 are provided on the inside of the bore at the lower end, for receiving the corresponding screw threads 12 of element 11. A collar 16 having a diameter slightly smaller than that of the bore through socket element 15 is provided near the end of said socket element opposite the screw threads 14. A rounded terminal element 19 is provided with a swivel eye formation 18. A pair of specially formed flanges 20a and 20b having an opening 22 there between are attached at the proximate end of said terminal element 19. Flanges 20a and 20b are attached to terminal element 19 by stems 24a and 24b, respectively. Opening 22 extends through not only flanges 20a and 20b, but also through stem 24, splitting it into two halves, 24a and 24b. The outside diameter of stem 24 is the same as the inside diameter of collar 16. Flanges 20a and 20b form a rounded head at the end of stem 24. Opening 22 is provided in the form of a slice that cuts between flanges 20a and 20b, as well as stem 24a and 24b.

Terminal element 19 is made of a rigid material such as a plastic or metal. Even so, the gap 22 between flanges 20a and 20b allow said flanges to be compressed together so that they may be squeezed across collar 16 of socket element 15. When the proximate end of terminal element 19 is squeezed onto the corresponding end of socket element 15, flanges 20a and 20b compress inside collar 16 until stem 24 is reached. At this point, the flanges pop back into place as shown in FIG. 2, and stem 24 fits snugly inside collar 16.

DESCRIPTION OF THE PREFERRED EMBODIMENTS

In the preferred embodiment, the present invention is made of rigid plastic or metal, although wood or other material may also be used. The rope or cord 10 is designed to be inserted into the bore 17 of base screw element 11, and attached thereto by epoxy, thermal adhesion, chemical adhesion, or other permanent bonding between the rope and the plastic screw element.

Terminal element 19 is provided with a swivel eye 18 that allows attachment of the invention to other objects or ropes. The proximate end of terminal element 19 has a stem 24 protruding therefrom, at the end of which is a rounded head 20 of large diameter. A slice 22 cuts evenly down the middle of the head and stem, splitting it into a separate set of flanges 20a and 20b and stems 24a and 24b.

Pressing the flanges 20a and 20b of terminal element 19 against the upper opening of socket element 15 causes said flanges to come in contact with collar 16. As pressures apply, flanges 20a and 20b compress inside collar 16 until stem 24 is reached. At this point, said flanges pop into their original position, locking the terminal element 19 into socket element 15. (See FIG. 2.)

Thereafter, base screw element having the rope securely bonded thereto, is screwed into the lower opening of socket element 15. When element 11 is entirely inserted into socket element 15, point 13 rests within gap 22 between flanges 20a and 20b as seen in FIG. 2. This particular position of point 13 prevents flanges 20a and 20b from being compressed against each other enough to ever slide back out across collar 16. The application of permanent adhesive material to screw threads 12 prior to the insertion of base screw element 11 into socket element 15 will prevent base screw element 11 from ever being removed, resulting in the permanent placement of point 13 between flanges 20a and 20b.

This structure is easy to manufacture, and provides a secure attachment to the rope, while at the same time allowing the swivel to freely pivot.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:
1. A swivel end fitting for rope comprising:
   a. a linear base element having screw threads along its length, a point at one end, and a bore at the opposite end for receiving a rope;
   b. a linear socket element having a bore therethrough, said bore having screw threads on the inside thereof at one end for receiving said base element, and a collar on the inside thereof at the other end;
   c. a rounded terminal element having a stem at one end thereof having approximately the same diameter as said collar, said stem terminating in a rounded head having a larger diameter than said stem, said head and stem being bisected by a linear gap therebetween whereby the bisected parts of said head and stem may be temporarily squeezed together closing said gap in order to pass across said collar on said socket element, whereupon said bisected parts return to their original position opening said gap.

2. The invention described in claim 1 wherein the point on said base element protrudes into the gap between the bisected parts of the head when said base element is screwed completely into said socket element.

3. The invention described in claim 2 wherein a screw eye is provided on the rounded end of said terminal element opposite said stem.

* * * * *